Inventors
W. B. HULLHORST
R. A. PIM

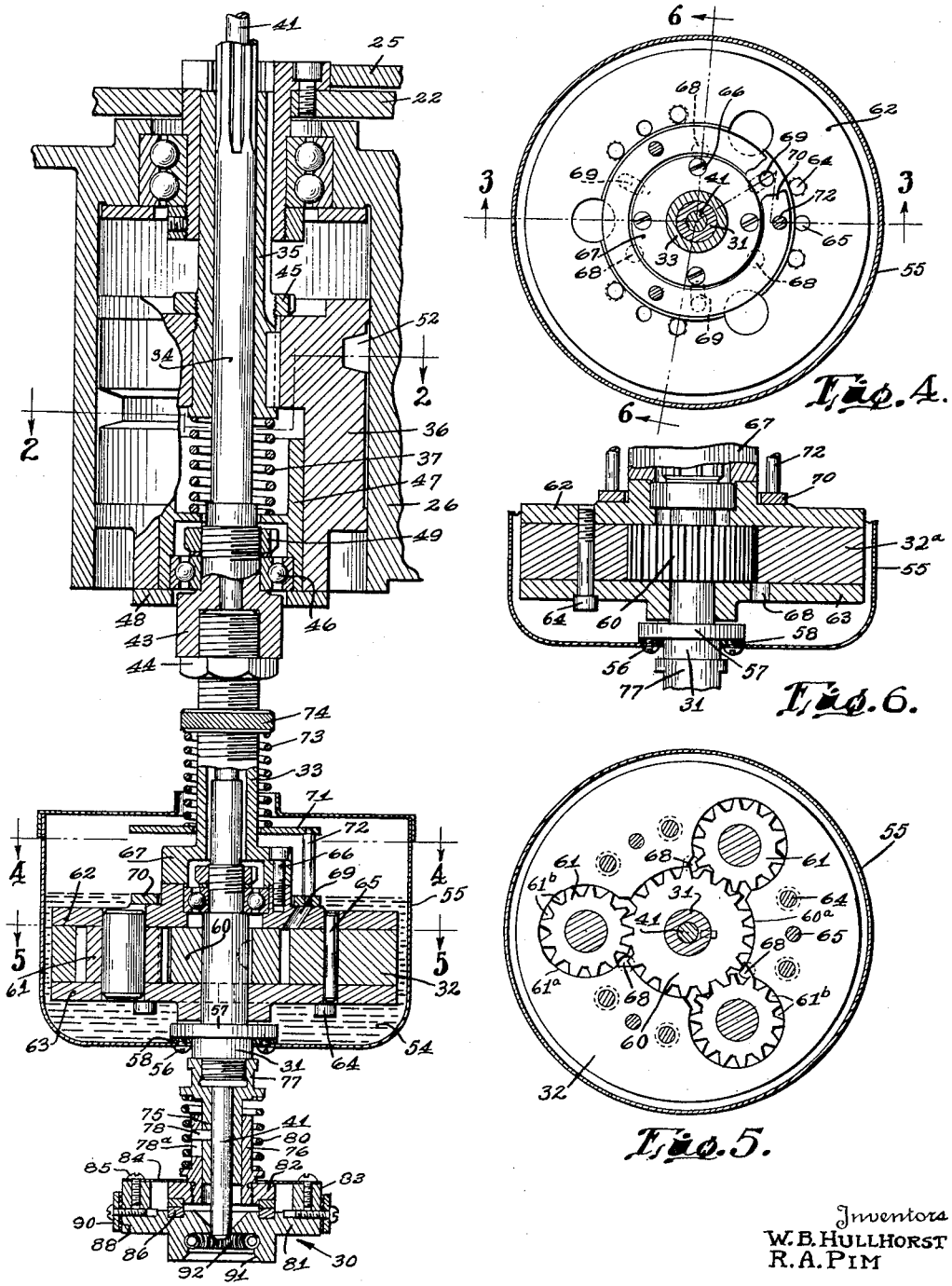

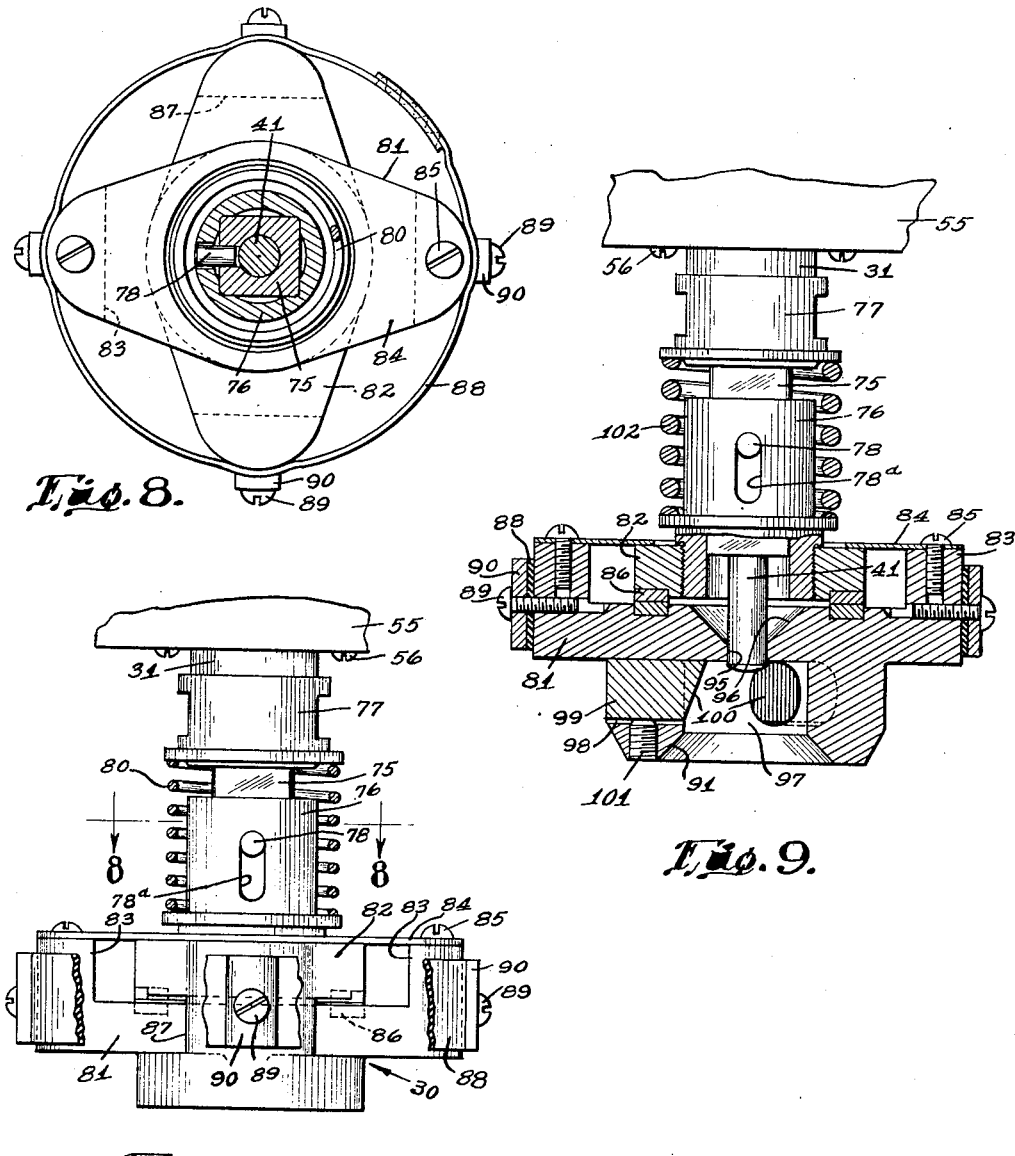

Patented July 3, 1951

2,559,358

UNITED STATES PATENT OFFICE 2,559,358

APPARATUS FOR TIGHTENING CAPS

William B. Hullhorst and Richard A. Pim, Toledo, Ohio, assignors to Owens-Illinois Glass Company, a corporation of Ohio Application September 27, 1946, Serial No. 699,936

12 Claims. (Cl. 226—88)

Our invention relates to a machine for automatically screwing and tightening caps or closures on bottles, jars or other containers. In the commercial processing and packaging of food products and other commodities in jars or containers with which screw-threaded caps are used for closing and sealing the containers, it is customary to place the caps loosely on the containers and thereafter bring the containers in rapid succession to a station at which the caps are automatically screwed down to position and tightened. In order to properly seal the containers, the caps must be tightened to a predetermined degree. On the other hand, the application of an excessive torque in tightening the cap must be avoided. Great difficulty has been experienced in the use of prior art devices designed for this purpose, owing to the inability to accurately control the degree of torque or force applied in tightening the cap, such difficulty being due, in part, to the rapidity with which this operation must take place to meet commercial requirements. The caps must be rotated or screwed rapidly into sealing position at which the rotation is suddenly arrested, making it difficult to accurately control the final tightening torque. An object of the present invention is to overcome this difficulty, and to this end provides a cap tightening apparatus in which the torque is accurately controlled and maintained within the required limits.

When a cap has been screwed down so that the sealing gasket therein seats on the container, a rather high downward pressure is needed for the final tightening and sealing of the cap on the container. Such pressure, if applied before the cap is screwed down, would crush or injure the cap. Also, subjecting the cap to such pressure while it is being screwed down, would often result in breakage of the threads on the container or in other damage, particularly where there is some obstruction to the free rotation of the cap on the threads of the container, as for example, where the cap is not squarely seated on the mouth of the container. An object of our invention is to provide a construction by means of which this difficulty is overcome and by which only a light pressure is applied while the cap is being screwed down toward sealing position and the pressure thereafter increased as required to properly tighten the cap.

A feature of the invention relates to the provision of a novel form of coupling between the driving shaft and the cap tightening chuck, such coupling being in the nature of a hydraulic pump through which the driving power is transmitted and by which the turning force or torque applied to the chuck is automatically determined and controlled.

A further object of the invention is to provide a novel form of cap tightening chuck which is comparatively very light in weight, thereby avoiding excessive inertia which, owing to the rapid rotation of the chuck, has a tendency to apply too great a turning force to the cap as the rotation of the cap is suddenly arrested when the sealing position is reached.

A further object of the invention is to provide a novel form of floating chuck which automatically adjusts itself in lateral directions to container necks or finishes which are off center.

Other objects of the invention and the precise nature thereof will appear more fully hereinafter.

Referring to the accompanying drawings:

Fig. 3 is a sectional elevation at the line 3—3 on Fig. 4, showing a portion of the machine on a larger scale than Fig. 1 and showing the relation of parts assumed when the chuck is empty;

Fig. 4 is a section at the line 4—4 on Fig. 3;

Fig. 5 is a section at the line 5—5 on Fig. 3, showing particularly the gears of the hydraulic coupling;

Fig. 6 is a sectional elevation of the hydraulic coupling or pump, the section being at the line 6—6 on Fig. 4;

Fig. 7 is a fragmentary part sectional elevation of the chuck;

Fig. 8 is a section at the line 8—8 on Fig. 7; and

Fig. 9 is a part sectional elevation showing a modified form of chuck.

Figures 1, 2:
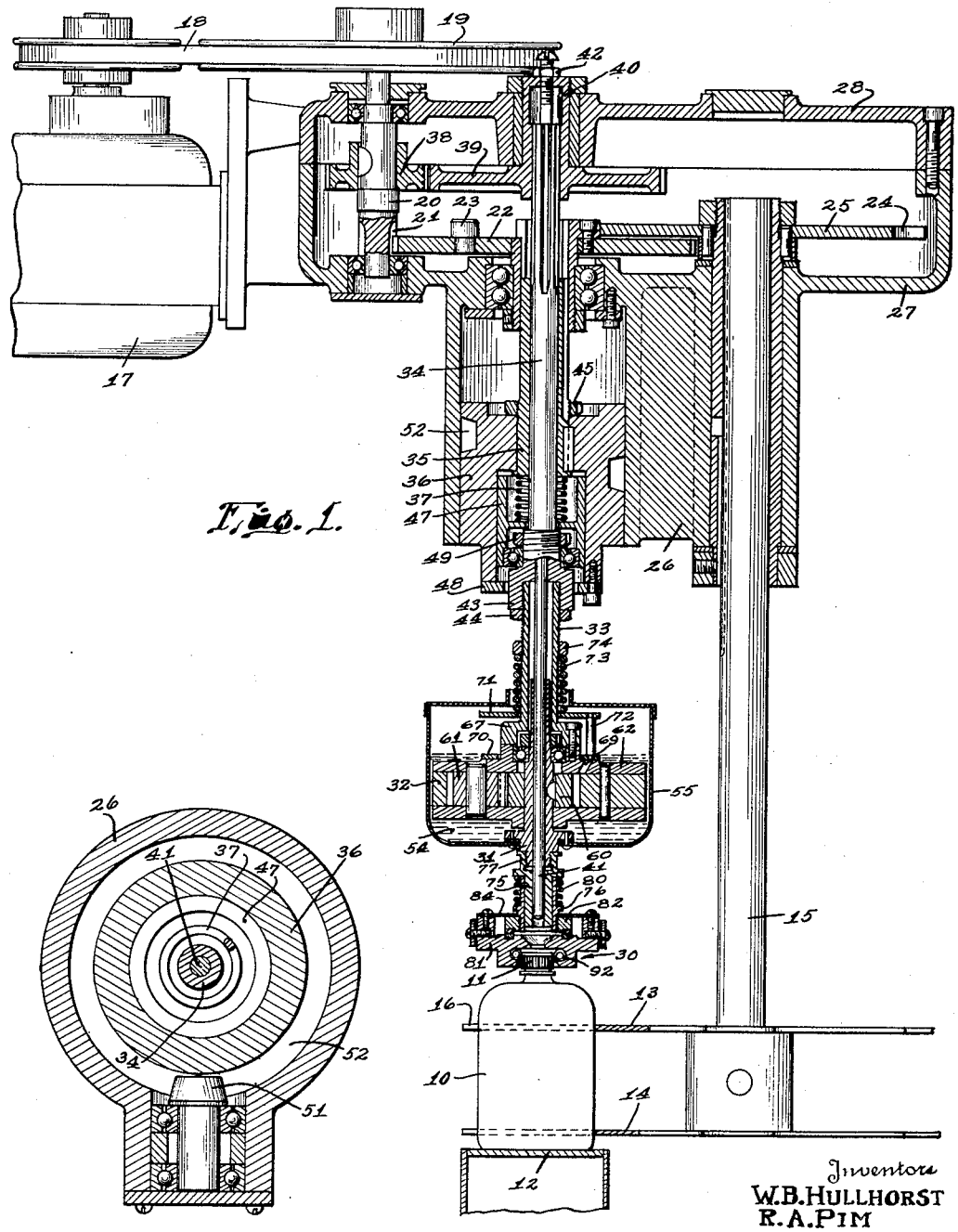
Fig. 1 is a view in sectional elevation of a machine embodying our invention.
Fig. 2 is a section at the line 2—2 on Fig. 3.

Referring to Fig. 1, a container 10, herein shown as a bottle provided with a screw-threaded cap 11, is supported on a belt conveyor 12 by which the containers are brought in succession to the cap sealing station. The means for positioning the containers at the station and holding them stationary during the cap screwing and sealing operation comprises a pair of spiders 13 and 14 attached to a vertical shaft 15. The spiders are formed with pockets 16 at intervals in their periphery to receive the containers. The shaft 15 is rotated intermittently, step-by-step, by means of a continuously running electric motor 17 operating through a gear train including a Geneva drive which may be of conventional construction. The gearing comprises a belt 18 driven by the motor and running over a pulley 19 keyed to a shaft 20 journalled in a gear casing and formed with gear teeth 21 which mesh with a gear 22 of the Geneva drive. A driving roll 23 on the gear 22 engages slots 24 formed in a Geneva wheel 25 for intermittently rotating the latter which is attached to the upper end of the shaft 15. The shaft 15 is journalled in a bearing block 26 which may be cast integral with the lower section 27 of the gear case which includes an upper removable cover section 28.

The cap tightening mechanism includes, in general terms, a chuck 30 connected to rotate with a shaft 31 and mounted for a limited up-and-down movement relative to the shaft 31, the latter being connected through a hydraulic coupling 32 to the lower end of a sectional tubular shaft comprising a lower shaft or section 33 attached to an upper section 34. A tubular shaft 35 surrounding the shaft 34 and movable up and down relative thereto, is keyed to a cam 36. The cam operates through the shaft 35 and a coil spring 37 to apply downward pressure to the chuck.

The several shafts 31, 33, 34, 35 and parts carried thereby are mounted for rotation and are driven by the motor 17 through gearing including a spur pinion 38 (Fig. 1) which is keyed to the shaft 20 and drives a gear 39 formed with a hub 40 journalled in the gear case. The gear 39 is splined on the shaft 34 which permits the latter to move up and down in the gear. A vertical rod 41 has its upper end portion threaded in the hub 40 and is locked therein by a lock nut 42, permitting vertical adjustment of the rod which extends downward through the tubular shafts 34, 33 and 31 to the chuck 30 and serves a purpose hereinafter set forth. The shaft section 34 is formed at its lower end with an internally threaded socket 43 to receive the upper threaded end of the shaft section 33 which is adjustable up and down in the socket and locked in adjusted position by a nut 44.

The cam 36 is cylindrical and is mounted for up-and-down movement within a cylindrical chamber formed in the block 26. The cam is keyed to the shaft 35 for rotation therewith and locked to the shaft for up-and-down movement therewith by a lock nut 45. The shaft 34 is journalled adjacent to its lower end in ball bearings 46 in a ball bearing cage 47 which is mounted in a cylindrical recess in the cam 36 and has a limited up-and-down movement relative to the cam. The coil spring 37 is held under compression between the cage 47 and the lower end of the shaft 35. A ring 48 bolted to the lower end of the cam provides a stop to limit the downward movement of the cage 47. The shaft 34 and parts suspended therefrom are connected for up-and-down movement with the cage 47 through the ball bearings 46 and a lock nut 49.

The up-and-down movements of the cam 36 and parts carried thereby, are controlled by a cam follower roll 51 (Fig. 2) journalled in the block 26 and running in an endless cam groove 52 formed in the periphery of the cam. The cam 36 is rotated by the drive shaft 20 (Fig. 1) operating through the pinion 21 formed thereon and the gear 22 running in mesh with the pinion 21, the hub of the gear 22 being keyed to the shaft 35 which, as before noted, is keyed to the cam. The chuck 30 is also driven from the shaft 20 operating through the gear 38 keyed to the shaft 20 and the gear 39 running in mesh with the gear 38 and splined on the shaft 34 which rotates the chuck. It will be noted that the diameters of the gears 39 and 38 through which the chuck is rotated are so proportioned as compared with the gears 22 and 21 through which the cam 36 is driven, that the chuck makes several complete rotations during each rotation of the cam. The cam track or groove 52 is designed to lower the chuck while a container 10 is held stationary therebeneath, thereby causing the chuck to engage the cap and screw it down and tighten it on the container.

The hydraulic coupling 32, in the form of a gear pump, is mounted concentrically with the shaft 31 and is immersed in a liquid 54, such as a light oil, within a reservoir in the form of a sheet metal tank 55. The tank is attached to the shaft 31 by screws 56 which extend through a ring gasket 58 and are threaded into a flange 57 formed on the shaft. The pump comprises a center gear 60 keyed to the shaft 31 and gears 61 running in mesh with the gear 60. The gear 60 is mounted to rotate in a circular opening or well 60ª formed centrally within a block 32ª, and the gears 61 are mounted to rotate in arcuate wells 61ª formed in the block 32ª and opening into the central well 60ª. The gears are interposed between upper and lower disk-like plates 62 and 63 which together with the block 32ª form a gear case in which the gears 61 are journalled, the plates and said block being bolted together by screw bolts 64 and doweled together by dowel pins 65. The gear case is attached by bolts 66 to a head 67 on the shaft 33.

Intake ports 68, one for each gear 61, extend through the lower plate 63. Outlet ports 69, individual to the gears 61, extend through the upper plate 62. An annular valve 70 seats on the upper plate 62 and closes the outlet ports 69. An annular disk 71 is connected to the valve 70 by posts 72. A coil spring 73 surrounding the shaft 33 is held under compression between the disk 71 and a nut 74 threaded on the shaft 33. The pressure of the valve spring 73 is adjustable by means of the nut 74 for adjustably controlling the maximum degree of the turning force or torque applied to the caps.

The operation of the hydraulic coupling 32 is as follows:

A bottle cap 11 (Fig. 1) is screwed downward on the bottle neck by the rotation of the shaft 33 and with it the coupling 32 and chuck 30. The coupling and chuck rotate as a unit with the shaft 33 until the cap engages the top sealing surface of the bottle neck and encounters a comparatively high resistance to further rotation. This resistance arrests the rotation of the chuck shaft 31 and the gear 60 keyed thereto (Fig. 5), so that continued rotation of the shaft 33 causes the gear case, including the block 32ª and plates 62, 63, to revolve about the shaft 31. This causes the gears 61 to rotate individually, each about its own axis as they travel in mesh with the center gear 60. Each gear 61 and the surrounding wall of the well 61ª define a series of pockets 61ᵇ, each said pocket being formed by two adjoining gear teeth and the opposite wall portion of the well. These pockets are filled with transmission fluid 54 drawn therein suctionally through one of the inlet ports 68 (Figs. 4 and 6), said inlet port being located at the point at which the gear teeth of the gears 60 and 61 are unmeshed. These pockets 61ᵇ are carried by the clockwise rotation of the gear 61 along the wall of the well to the point at which the gear teeth of the gears 61 and 60 intermesh. The intermeshing gear teeth fill the pockets 61b, thereby forcing the oil out of said pockets and through the discharge port 69 located thereover. In this manner there is produced a circulation of the oil or transmission fluid 54, such circulation being opposed by the spring pressed ring valve 70. The degree of resistance to such circulation and relative rotation of the gears is determined by the spring pressure behind the ring valve 70 which is seated over the discharge ports 69.

The chuck 30 (see Figs. 3, 7, 8) is connected to the lower end of the shaft 31 by means of a chuck spindle in the form of an extensible shaft comprising tubular telescopically connected shaft sections 75 and 76. The inner section 75 is squared and fits the correspondingly shaped bore of the outer section 76 (Fig. 8). The section 75 is formed with an internally screw-threaded socket 77 by which it is attached to the shaft 31. A pin 78 attached to the inner section 75 and extended into a vertical slot 78a in the section 76, permits limited telescoping movement of said sections. A light coil spring 80, held under compression between the telescoping sections, applies light downward pressure of the chuck on the bottle cap 11 while the cap is being screwed down on the container.

The chuck, as shown in Figs. 3, 7, 8, is designed to be of comparatively light weight to reduce to a minimum the inertia encountered when the rapid rotation of the chuck is suddenly arrested as the cap is tightened on the container. The chuck comprises a lower member or cross bar 81 and an upper member or cross bar 82 overlying and extending at right angles to the lower member 81. The lower bar 81 is formed at its ends with upward extensions or posts 83 to which is attached a thin metal plate 84 secured by screws 85. The plate 84, which may be of substantially the same contour as the underlying cross bar 81, holds the upper cross bar 82 seated on the lower member 81. Bearing rings 86 of hardened metal are set in the inner faces of the members 82 and 81. The upper member 82 is formed at its ends with depending extensions 87 similar to the extensions 83.

The upper cross bar 82 of the chuck is screw-threaded onto the lower end of the shaft 76, thereby rigidly uniting it with the shaft for rotation therewith. The lower member or cross bar 81 of the chuck has a floating connection with the upper member, being free for limited movement laterally in any direction relative to the upper member. This permits the chuck to adjust itself automatically to any cap and its container, particularly where the threaded neck of the container is off center or not in exact alignment with the chuck spindle while the container is held in fixed position at the capping station. The floating member 81 is normally held centered by a flexible band 88 surrounding said members and secured to the ends of both members by screws 89. The band 88 which may consist, for example, of a flexible fiber or canvas band impregnated with a rubber composition, provides a driving connection between the members 82 and 81. Washers 90 are interposed between the band and the screws 89. The lower chuck member 81 is formed with an upwardly tapered opening 91 in its lower face to receive the upper rim of the cap 11 and center the chuck on the cap. A garter spring 92 seated within the chuck opening provides a means for gripping the corrugated cap and preventing it from slipping.

The rod 41, the upper end of which is anchored in the hub 40 (Fig. 1), extends vertically downward throughout the length of the spindle, the lower end of the rod protruding through a central opening 95 (see Fig. 9) in the lower floating member 81 of the chuck, when the latter is empty. When the chuck is lowered for screwing a cap into position the member 81 is carried below the rod and thereby freed for floating action. A tapered surface 96, forming an upwardly flared extension of the opening 95, serves as a means for centering the floating member 81 when the chuck is retracted. The rod 41, in addition to serving as a centering means for the floating chuck member, also operates to positively eject from the chuck any cap which might stick to the chuck or be lifted therewith.

Fig. 9 illustrates a modified form of chuck which is particularly designed for use with sheet metal caps. In this construction, the wall of the cylindrical opening 97 which receives the cap when the chuck is lowered, is provided with openings 98 to receive cap gripping plugs 99. The inner or cap engaging surfaces of the plugs are formed with corrugations or ribs 100 for gripping the cap. These corrugated or saw-tooth surfaces may be upwardly and inwardly inclined as shown, to grip the upper corner or periphery of the cap. The plugs are adjustable radially and locked in place by set screws 101. This form of chuck is particularly adapted for use with metal caps and a comparatively heavy spring 102 is used to apply the required pressure to avoid slippage while the cap is being screwed down.

A résumé of the operation is as follows:

While a container 10 (Fig. 1) with a screw cap 11 seated loosely thereon is held stationary by the spiders 13, 14, the continuously rotating cam 36 lowers the chuck spindle which is rotating at a much higher speed than the cam, said spindle including the sectional shaft 34, 33, and carrying the hydraulic coupling 32 and the chuck 30 suspended from the shaft 31 of the coupling. The coupling 32 or gear pump rotates with the chuck spindle. The shaft 31 (Fig. 3) is rotated as a unit with the shaft 33, the fluid 54 serving as a driving means between the gears 61 and the center gear 60. The rotating chuck as it moves downward, engages the cap and rapidly rotates it, screwing it down to the position in which the sealing gasket therein seats on the lip of the bottle 10. The light coil spring 80 applies a light downward pressure during this operation until the cap has reached a sealing position. By this time, the shaft section 75 has reached the limit of its downward movement relative to the section 76 so that the continued downward movement of the cam 36 then operates through the comparatively heavy spring 37 to apply a heavy pressure to the cap during the final movement to sealing position. As the cap is arrested, the turning torque applied through the revolving pump gears 61 quickly builds up a hydraulic pressure in the fluid by which the valve 70 is lifted from its seat, thus preventing a further increase in the pressure or turning torque which then remains constant until the chuck is withdrawn.

Modifications may be resorted to within the spirit and scope of our invention.

We claim:

1. A machine for screwing caps on containers, comprising means for holding a container at a cap tightening station with a cap seated loosely on the container, a rotary driving element and a rotary driven element in vertical alignment and mounted over the container at said station, a cap tightening chuck, a vertically extensible chuck spindle carrying the chuck and connected to said driven element, spring means for yieldingly holding the spindle extended, a hydraulic coupling connecting said elements and including a gear concentric with and connected to one said element, a gear casing enclosing said gear and connected to rotate the other said element, a second gear journalled in the casing and intermeshing with the first mentioned gear, a hydraulic fluid, a reservoir containing said fluid, said casing and gears being immersed in said fluid, said casing being provided with inlet and outlet port openings for the entrance and egress of fluid circulated by rotation of said gears, a valve closing the outlet port, spring means yieldingly holding the valve closed, means for rotating the driving element and thereby causing rotation therewith of the said casing and driven element as a unit, and means for lowering the driving element as it is rotated and causing it to rotate the chuck and screw the cap onto the container and simultaneously move the chuck upwardly relative to the driving element against the pressure of said spring means, a second spring means interposed between the said driving element and its lowering means operable to apply an increased downward spring pressure to the cap during the continued downward movement of the driving element after the said screwing of the cap on the container, said valve being movable to open position by the fluid pressure when the driving torque is built up to a predetermined degree by the resistance to the rotation of the chuck.

2. Apparatus for screwing and tightening a screw cap on a container, comprising a vertical drive shaft mounted for rotation about a vertical axis and for up-and-down movement, a chuck and chuck spindle, means connecting the chuck and spindle to the drive shaft in vertical alignment therewith and permitting a limited up-and-down movement of the chuck relative to the drive shaft, spring means for holding the chuck extended downward relative to the drive shaft with a yielding pressure, means for rotating the drive shaft and simultaneously lowering it with the chuck in engagement with a cap on the container thereby causing the chuck to screw the cap on the container and simultaneously causing said upward movement of the chuck relative to the drive shaft, and spring means for applying an increased downward yielding pressure to the chuck and cap during said lowering of the drive shaft after the chuck has reached the limit of its said upward movement relative to the drive shaft.

3. The combination of a cap tightening chuck, an extensible chuck spindle comprising telescoping sections relatively movable lengthwise of the spindle, a coil compression spring mounted on the spindle and yieldingly holding it extended, a drive shaft mounted for rotation about a vertical axis and for up-and-down movement, means connecting the spindle to the drive shaft for rotation and up-and-down movement therewith, means for rotating and lowering the drive shaft and spindle, and means for applying spring pressure in a downward direction to the drive shaft and through the drive shaft to the said spindle during such rotation and lowering.

4. A machine for screwing and tightening caps on containers, comprising a drive shaft, means for rotatably mounting the drive shaft in a vertical position, a cap tightening chuck and chuck spindle connected to the lower end of the drive shaft, means for continuously rotating the drive shaft and chuck, cam means for periodically lifting and lowering the drive shaft and chuck, a spring interposed between said cam means and drive shaft and applying a yielding downward pressure to the drive shaft and chuck, said chuck being free for a limited up-and-down movement relative to the drive shaft, and a light coil spring holding the chuck in its lowered position relative to the drive shaft and thereby yieldingly holding the chuck on a cap as the latter is screwed onto the container, said first mentioned spring being operable thereafter to apply an increased pressure of the chuck on the cap as the latter is tightened on the container.

5. A cap screwing head or chuck comprising upper and lower horizontally disposed elements, a chuck spindle having a fixed connection with the upper element and extending upwardly therefrom, means for rotating the chuck spindle and chuck, each of said elements having their end portions horizontally spaced from the end portions of the other said element, and at substantially the same level, and means providing a driving connection between said elements permitting universal horizontal floating movement of the lower element, said last mentioned means comprising a flexible horizontal band surrounding said elements and attached to said end portions.

6. A chuck comprising upper and lower horizontal bars in superposed horizontal sliding relation and formed respectively with downward and upward end extensions providing stops to limit relative rotative movement of said bars, and a peripheral flexible band surrounding said bars and connected to the ends thereof and forming a driving connection between said bars permitting a universal horizontal floating movement of the lower bar relative to the upper bar, said lower bar comprising centering means for centering it on a cap.

7. Apparatus for screwing and tightening caps on containers, including means for holding a container in a predetermined position with a cap loosely seated thereon, a vertical drive shaft spaced above and aligned with the container and cap, a hydraulic coupling connected to and suspended from said shaft, a chuck interposed between said coupling and the said cap and connected through the coupling to the drive shaft to be rotated thereby, said chuck being mounted for a limited up-and-down movement relative to the coupling, spring means holding the chuck in its lowered position relative to the coupling, means for rotating said shaft, coupling and chuck as a unit about the axis of said shaft, means for moving said unit downward during said rotation and thereby causing the chuck to engage and rotate the cap and screw it down on the container and simultaneously causing said upward movement of the chuck relative to the coupling against the spring pressure of said spring means, said hydraulic coupling including a rotary driving element and rotary driven element connected respectively to the shaft and chuck, a hydraulic fluid circulated by relative rotation of said elements, and valve means opposing said circulation and yieldable to permit rotation of the drive shaft independently of the chuck when the driving force applied to the chuck is built up to a predetermined degree by the resistance of the cap to turning movement, and a second spring means for applying an increased downward pressure on the cap during the final tightening movement of the cap.

8. A machine for screwing and tightening caps on containers, comprising means for holding a container at a cap tightening station with a cap loosely seated on the container, a drive shaft, means for mounting the drive shaft over the container in vertical position, a chuck, a chuck spindle carrying the chuck and connected to the drive shaft and positioned over the said container and cap, said chuck comprising a cap engaging floating element floatingly mounted on the chuck spindle for universal horizontal movement relative to the spindle, said floating element having a bottom recess with downwardly and outwardly flared walls for engaging the cap, means for lowering and lifting the chuck to and from the cap engaging position, a centering rod mounted concentrically with the drive shaft, said floating element having a central opening with upwardly and outwardly flared walls positioned to be engaged by said centering rod when the chuck is lifted and thereby center said floating element, and means for holding the centering rod, during the lifting and lowering of the chuck, at a fixed height, such that the rod is projected into said central opening as the chuck is lifted and is withdrawn from said central opening as the chuck is lowered.

9. The combination of a vertical tubular drive shaft mounted for rotation about a vertical axis, a chuck, a chuck spindle carrying the chuck and mounted on the lower end of said drive shaft, means for rotating said shaft and chuck, means for lifting and lowering the shaft and chuck, said chuck comprising a horizintally disposed floating element mounted on the chuck spindle for universal floating horizontal movement relative to the spindle and formed with a central restricted opening therethrough in axial alignment with the drive shaft, a vertical rod, means for holding the rod at a fixed height during said lifting and lowering of the chuck, said rod extending downwardly through the drive shaft and into the opening in said floating element when the chuck is in its lifted position, said opening having upwardly and outwardly flared walls to engage said rod and center said floating element when the chuck is lifted.

10. The combination of a vertical tubular drive shaft mounted for rotation about a vertical axis, a chuck, a chuck spindle carrying the chuck and mounted on the lower end of said drive shaft, means for rotating said shaft and chuck, means for lifting and lowering the shaft and chuck, said chuck comprising a horizontally disposed floating element mounted on the chuck spindle for universal floating horizontal movement relative to the spindle and formed with a central restricted opening therethrough in axial alignment with the drive shaft, said floating element having a bottom recess extending upwardly from its lower face, and means in said recess to engage and hold a cap while the chuck is rotating, a vertical rod within the tubular drive shaft, means for holding said rod at a fixed height during said lifting and lowering of the shaft and chuck, said rod being of a length and in a position to engage and positively eject any cap adhering to the chuck when the latter is lifted to its elevated position.

11. A cap screwing chuck comprising upper and lower horizontally disposed elements, a vertical chuck spindle having a fixed connection with the upper element and extending upwardly therefrom, means for connecting the said lower element to the upper element with the lower element supported by said upper element and free for universal horizontal movement relative to the upper element, said elements having their ends at substantially the same height and the ends of each said element spaced horizontally from the ends of the other said element, and a flexible horizontal band surrounding said elements and attached to said ends and forming a driving connection between said elements.

12. Apparatus for screwing and tightening caps on containers, including means for holding a container in a predetermined position, a vertical drive shaft spaced above and aligned with the container and a cap, a hydraulic coupling connected to and suspended from said shaft, a chuck interposed between said coupling and the said cap and connected through the coupling to the drive shaft to be rotated thereby, said chuck being mounted for a limited up-and-down movement relative to the coupling, spring means holding the chuck in its lowered position relative to the coupling, means for rotating said shaft, coupling and chuck as a unit about the axis of said shaft, means for moving said unit downward during said rotation and thereby causing the chuck to engage and rotate the cap and screw it down on the container and simultaneously causing said upward movement of the chuck relative to the coupling against the spring pressure of said spring means, said hydraulic coupling including a rotary driving element and a rotary driven element connected respectively to the shaft and chuck, a hydraulic fluid circulated by relative rotation of said elements, and valve means opposing said circulation and yieldable to permit rotation of the drive shaft independently of the chuck when the driving force applied to the chuck is built up to a predetermined degree by the resistance of the cap to turning movement.

WILLIAM B. HULLHORST.
RICHARD A. PIM.

REFERENCES CITED

The following references are of record in the file of this patent:

UNITED STATES PATENTS

| Number | Name | Date |
| --- | --- | --- |
| 1,458,894 | Schwartz | June 12, 1923 |
| 1,742,496 | Cundall | Jan. 7, 1930 |
| 1,773,960 | Cundall | Aug. 26, 1930 |
| 2,026,118 | Barnby | Dec. 31, 1935 |
| 2,191,340 | Corrigan | Feb. 20, 1940 |
| 2,292,146 | Meuvier | Aug. 4, 1942 |
| 2,338,852 | Hohl et al. | Jan. 11, 1944 |
| 2,396,149 | Bock | Mar. 5, 1946 |